(12) United States Patent
Slater

(10) Patent No.: US 7,139,264 B1
(45) Date of Patent: Nov. 21, 2006

(54) COMMUNICATIONS SYSTEM

(75) Inventor: Iain J Slater, Beeston Ryland (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 714 days.

(21) Appl. No.: 09/590,331

(22) Filed: Jun. 8, 2000

(30) Foreign Application Priority Data

Oct. 26, 1999 (GB) ................................ 9925164.7

(51) Int. Cl.
*H04L 12/66* (2006.01)
(52) U.S. Cl. ................... 370/353; 370/351; 370/503; 370/509; 370/510; 370/507
(58) Field of Classification Search ................ 370/351, 370/353, 503, 509, 510, 507
See application file for complete search history.

(56) References Cited

U.S. PATENT DOCUMENTS

| | | | | |
|---|---|---|---|---|
| 5,886,996 | A * | 3/1999 | Wolf | 370/507 |
| 6,185,216 | B1 * | 2/2001 | Chapman | 370/402 |
| 6,560,245 | B1 * | 5/2003 | Slater | 370/537 |
| 6,567,422 | B1 * | 5/2003 | Takeguchi et al. | 370/503 |

FOREIGN PATENT DOCUMENTS

| | | |
|---|---|---|
| GB | 2 301 991 A | 12/1996 |
| WO | WO 96/39760 | 12/1996 |

\* cited by examiner

*Primary Examiner*—Chi Pham
*Assistant Examiner*—Raj Jain
(74) *Attorney, Agent, or Firm*—Kirschstein, et al.

(57) ABSTRACT

In a synchronous digital communications system a network of SDH (or SONET) equipments (SE) are arranged to exchange synchronisation signals via ports on the SEs, each port being allocated a source identifier (SID). These SIDs are used to identify the source of each synchronisation signal input at a particular SE. When the SE selects a synchronisation signal to transmit out of its ports, the SID associated with that selected signal is compared with SID of each port. If a match is found the synchronisation status message (SSM) associated with the synchronisation signal sent out at that port is set to "Do Not Use" (DNU) to warn the destination SE that the synchronisation signal has been looped back. Each SE is allocated a unique equipment identifier. The SID of each port is set to the unique SE identifier of SE to which it is directly connected.

6 Claims, 4 Drawing Sheets

Destination IDs

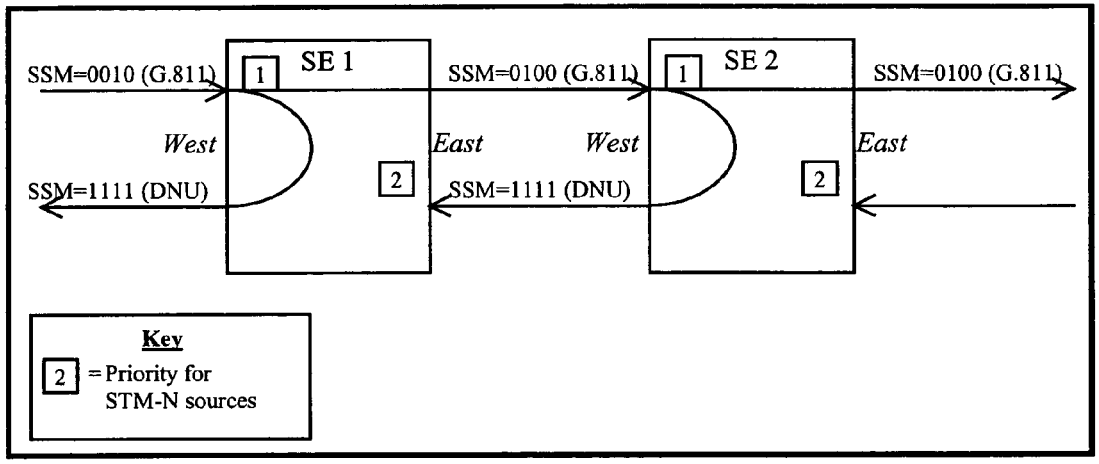
Figure 1    Timing Loop Prevention    PRIOR ART
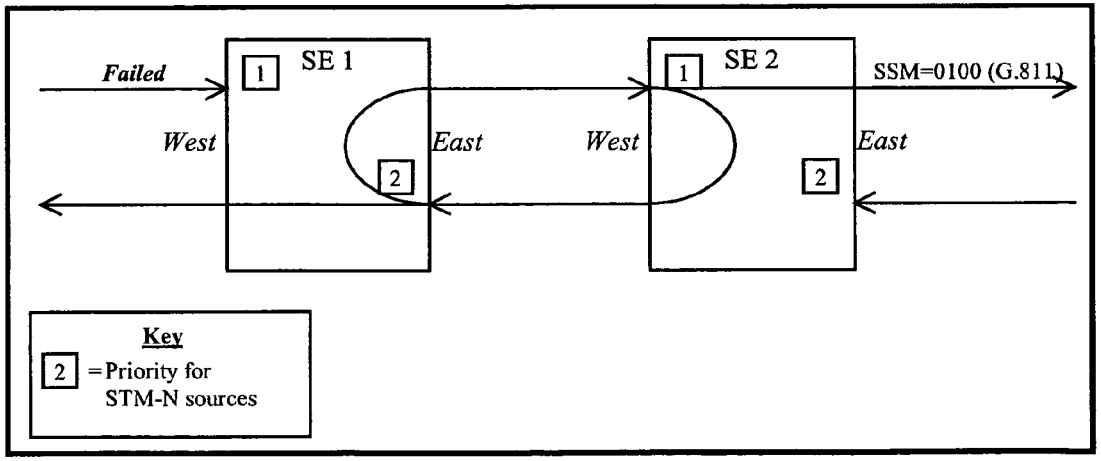
Figure 2    Synchronisation Timing Loop    PRIOR ART

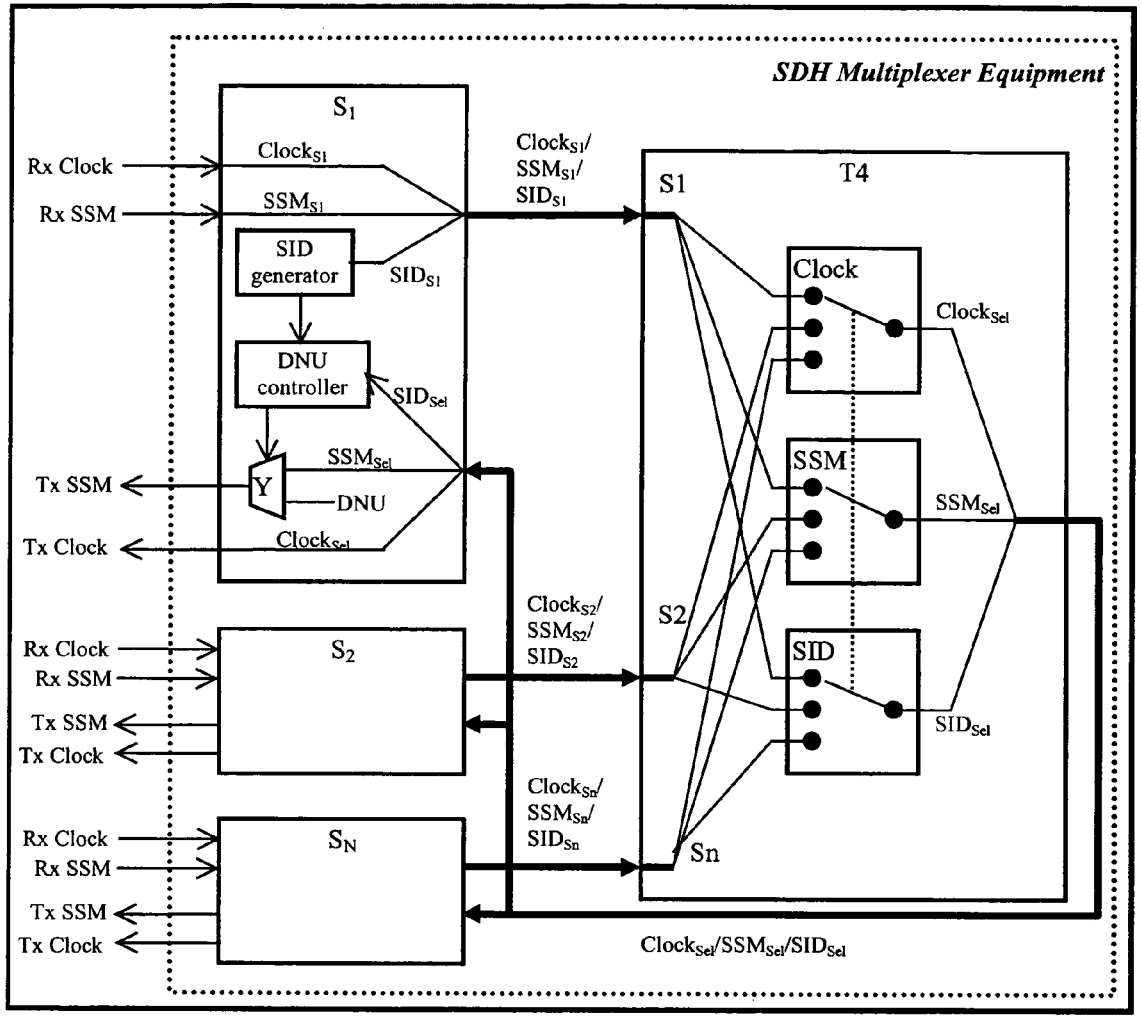
Figure 3  General use of SID in Timing Loop Prevention  PRIOR ART

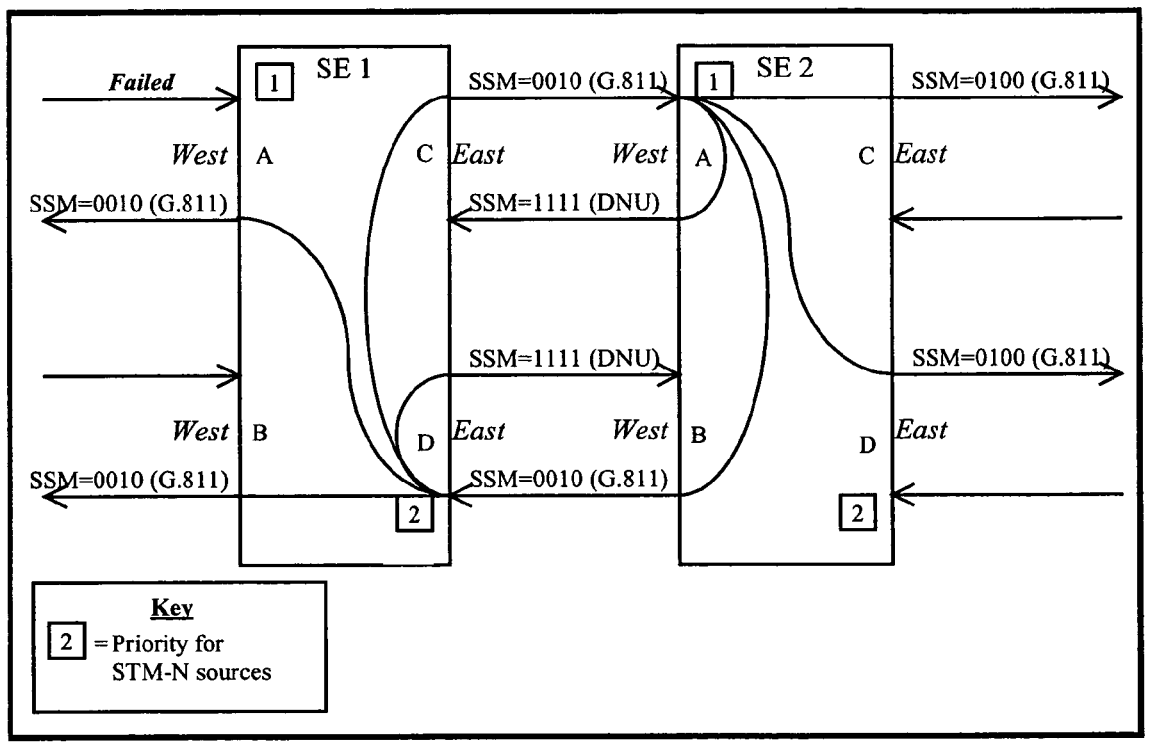
Figure 4    Multiple Port Timing Loop    PRIOR ART

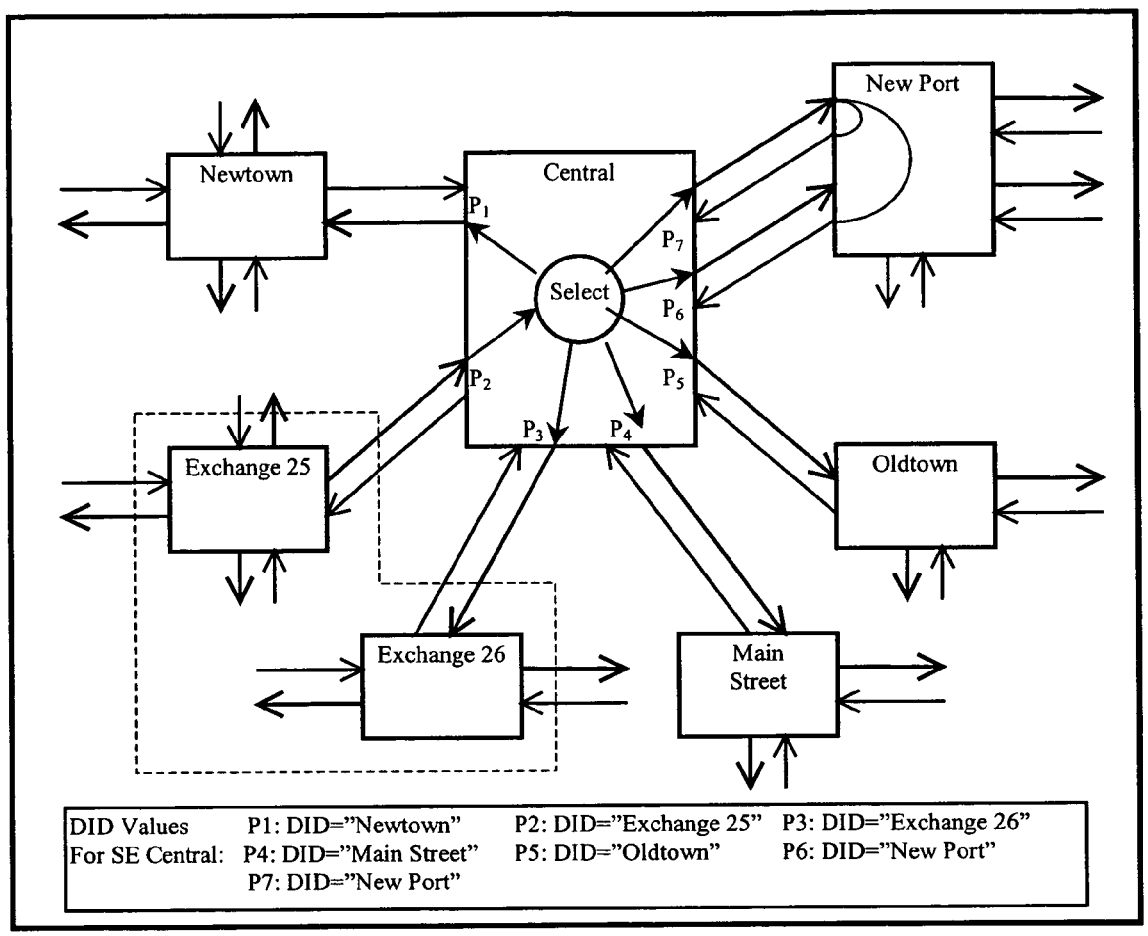
Figure 5    Destination IDs

COMMUNICATIONS SYSTEM

BACKGROUND OF THE INVENTION

The present invention relates to the field of synchronous hierarchy communications networks, for example synchronous digital hierarchy (SDH) and SONET networks and to the synchronisation of network elements within such networks.

A synchronous hierarchy communications network comprises a number of interconnected nodes or network elements (NE), e.g. SDH equipment (SE), arranged to exchange data, synchronisation and control signalling according to a synchronous hierarchy, as set out for example in the synchronous digital hierarchy (SDH) or SONET standards. Typically a synchronisation signal will be passed from one NE to the next, along with the data signal, so creating a synchronisation path through communicating NEs via data ports. The synchronisation is carried by virtue of the synchronisation signal's aggregate bit rate rather than the data it contains. The signal also carries the synchronisation status message (SSM).

For brevity in the following the invention will be described with reference to SDH, it being understood that the invention is also applicable to SONET. A significant feature of SDH systems is the ability of networks to automatically recover from synchronisation failures. To support this feature each SE requires a pre-configured synchronisation source priority table and each synchronisation signal must carry an indication of the quality of the timing source from which it is derived. In SDH networks, this indication of quality is carried in the SSM. For any one STM-N output, the SE will autonomously select from the SSM values of the available sources the one with the highest quality. The selection of which source to use to synchronise data signals sent out from STM-N ports of an SE is also controlled by the pre-configured priority table of that equipment. For any one STM-N output, one or a number of synchronisation sources can each be assigned a priority and the SE can use the priority table to identify the source with the highest priority. In practice priority is only used to select a synchronisation source if there are more than one available with the same, highest quality, or if a valid SSM is not available.

At a network level it is important that the overall trail of successive synchronisation sources (which may be described as a "daisy chain" of SEs passing synchronisation information from one to the other along the chain) always refers back to a designated external source. This is illustrated in FIG. 1. It is also important that every effort is made to prevent a timing loop occurring. A timing loop occurs when a synchronisation signal transmitted by a SE is returned (i.e. looped-back) to the same SE which then selects that looped-back synchronisation signal as its source for transmitting thus "closing the loop" such that there is no independent external source of synchronisation. This is illustrated in FIG. 2.

To avoid this situation, international standards (e.g. pr ETS 300 417-6-1) define a method whereby, when a synchronisation source input to a SE via a particular port is selected for onward transmission by that SE, the SSM sent out by that particular port is set to "do not use" (DNU). A synchronisation signal with an associated SSM of DNU will not be used. This ensures that a synchronisation signal directed back towards the original source of synchronisation is not itself used for synchronisation.

However, the method of the above International Standard does not cope with the situation where two adjacent NEs are connected via more than one port. Whereas a SSM of DNU will be transmitted on the first port at which the synchronisation signal is received, the second port connected to the same source of synchronisation can still output a synchronisation signal with a valid (i.e. non-DNU) SSM.

SUMMARY OF THE INVENTION

The present invention provides a communications system comprising a plurality of interconnected network elements (NE), in which each NE comprises one or more ports, each port for inputting from an adjacent one of the plurality of NEs a synchronisation signal and a quality level indication (QLI) for indicating the quality of the source of the synchronisation signal; each port for outputting to the adjacent NE a selected one of the input synchronisation signals and a QLI; in which each NE is associated with a unique NE identifier; in which each port of each NE is associated with a source identifier (SID) for identifying the port at which each synchronisation signal is input; in which each port of each NE comprises QLI means for setting the value of the QLI output at that port based on a comparison of the SID of that port with the SID of the selected synchronisation signal input port; and in which the SID of each port comprises the NE identifier of the adjacent NE.

The present invention also provides a method for indicating the quality level of synchronisation signals in a communications system comprising a plurality of interconnected network elements (NE), in which each NE comprises one or more ports, each port for inputting from an adjacent one of the plurality of NEs a synchronisation signal and a quality level indication (QLI) for indicating the quality of the source of the synchronisation signal; each port for outputting to the adjacent NE a selected one of the input synchronisation signals and a QLI; the method including the steps of allocating to each NE a unique identifier and allocating to each port of an NE a source identifier (SID) for identifying the port at which each synchronisation signal is input; receiving synchronisation signals at the port or ports of each NE; associating each received synchronisation signal with the SID of the port at which it is input; selecting for each NE one of the received synchronisation signals for output from the port or ports of that NE; comparing the SID associated with the selected synchronisation signal with the SID associated with each port at which that synchronisation signal is output and setting the QLI output at each port acording to the result of the relevant comparison; the method including the step of setting the SID of each port to the NE identifier of the NE to which that port is directly connected.

BRIEF DESCRIPTION OF THE DRAWINGS

Embodiments of the present invention will now be described by way of example with reference to the drawings in which:

FIGS. 1 to 4 show a telecommunications system of the prior art;

FIG. 5 shows a telecommunications system according to the present invention.

DETAILED DESCRIPTION OF THE PREFERRED EMBODIMENTS

Before describing the drawings, the various values of SSM will be explained. References to G.811, G.812 and G.813 relate to respective ITU standards which define the quality of the original clock from which synchronisation is derived. ITU Recommendation G.707 defines SSM values relating to different qualities of original clock. Five SSM codes are defined in draft ETS1 recommendation prETS 300 417-6-1 to represent the synchronisation source quality level, listed in order of decreasing quality level as follows:

Code 0010 (Quality PRC) means the synchronisation source is a PRC clock (ETS 300 462-6, ITU-T Recommendation G.811);

Code 0100 (Quality SSU-T), means the synchronisation source is a transit SSU clock (ITU-T Recommendation G.812) or a Synchronous Supply Unit (SSU) that is defined in ETS 300 462-4;

Code 1000 (Quality SSU-L), means the synchronisation source is a SSU clock (ITU-T Recommendation G.812);

Code 1011 (Quality SEC), means the synchronisation source is a SEC clock (ETS 300 462-5, option 1 of ITU Recommendation G.813);

Code 1111 (Quality DNU), means the synchronisation signal carrying this SSM shall not be used for synchronisation because a timing loop situation could result if used.

In the Figures numbers in squares denote the priority of sources of synchronisation signal received at the SE via the STM-N ports, one of which sources is selected by the SE on the basis of its quality and priority, to provide the synchronisation signal output. As indicated in FIG. 1, the West STM-N input receives a synchronisation signal with a quality level of G.811 associated with it and is allocated priority 1 as a source of synchronisation signal. The East STM-N input is allocated Priority 2. In fact, the synchronisation signal received at the East STM-N port of SE1 has been looped back at SE2 and this is reflected in the assigned SSM value DNU.

FIG. 2 illustrates the problem that can arise with a synchronisation timing loop. In FIG. 2 we see that the synchronisation source arriving at the West port of SE1 has failed and as a result SE1 has switched to its alternative synchronisation input at the East port. However the source of synchronisation signal at the East port has already been looped back in SE2 at its West port from the synchronisation signal previously supplied by SE1. Thus a loop is created without any reference to an external source of synchronisation with a consequent degradation of clock quality. This inferior synchronisation signal is also being propagated by SE2 via its East port with an inappropriately good SSM of G.811.

FIG. 3 shows the internal working of a conventional SE in more detail. In FIG. 3 each STM-N port $S_1, S_2 \ldots S_N$ of the SE comprises a source identity (SID) generator, a DNU controller and an SSM output selector Y. The SID generator provides a unique value identifying the relevant port for accompanying the received synchronisation and SSM signals through the SE. The SID value is also passed to the DNU controller for the same STM-N port.

The selectors (T4) are shown schematically as comprising three, ganged, single-pole, multi-way switches, one switch for each of: the synchronisation signal (Clock), the SSM and the SID. Each switch takes an appropriate input from each of the STM-N ports ($S_1$–$S_N$). The outputs of the T4 selectors are denoted $Clock_{SEL}$ $SSM_{SEL}$ and $SID_{SEL}$, respectively. The ganged selectors in FIG. 1 are automatically controlled by the SE. The operator configures the equipment with a number of possible sources (S1, S2, . . . $S_N$) and the automatic selection will normally select the source that has the highest quality as determined from its SSM value. However there are, in practice a number of special modes whereby the selection of the highest quality can be withheld when the quality of source changes in order to reduce the number of intermittent changes. In practice, the switching functions, described above would typically be performed in software. Considering STM-N Port S1: the SSM value and synchronisation signal ($SSM_{S1}$, $Clock_{S1}$) are derived from the STM-N inputs Rx Clock, Rx SSM and pass to the T4 selectors along with the locally generated SID value ($SID_{S1}$) unique to that port. The T4 selectors route the synchronisation signal received from a selected one of the STM-N ports for output from all of the STM-N ports. This selection process involves distribution of the synchronisation signal, the SSM and the SID in a ganged manner, i.e. the synchronisation signal SSM and SID from a single STM-N port are selected together and are then returned to all of the STM-N ports where the synchronisation signal and SSM are output from the SE but the SID is terminated at the DNU controller.

The DNU controller compares the SID of signals received from the selectors (SIDsel) with the SID applied directly from the local SID generator ($SID_{sx}$ where $x=1, 2 \ldots N$). If the two SID values agree then the signals received from the selectors are the same as those input to that port from the STM-N link, so in transmitting these same signals back to the same STM-N link, a loop-back is generated. In order to alert NEs connected to this STM-N link to this state of affairs, the STM-N port outputs a DNU SSM under control of the DNU controller. The DNU controller controls the operation of the SSM output selector Y to output either the SSM value received from the selectors (SSM sel) or the DNU value, accordingly.

In the example shown in FIG. 3, Port $S_1$ will output a Tx SSM of DNU while all other ports will present a $T_X$ SSM derived from $SSM_{S1}$.

FIG. 4 shows a further problem that can arise despite the use of SIDs as described above. The arrangement of FIG. 4 differs from that illustrated above in that SE1 and SE2 are now interconnected via two separate ports i.e. SE1 port C to SE2 port A and SE1 port D to SE2 port B).

Whereas the mechanism described above is effective in allocating an SSM of DNU to the synchronisation signal looped back to the port at which it was received (in this case SE2 port A) it does not prevent the synchronisation signal looped back to SE1 via the second port (i.e. SE2 port B) from being allocated an inappropriate SSM (i.e. SSM=G.811). This looped back timing signal is then propagated by SE1 from its west ports with the inappropriate SSM value.

A characteristic of SDH systems is that, for the purposes of network planning and overall control, each network equipment is allocated a unique identification (NEID). The NEID allocated to each node is centrally stored at a network control function which acts to control all the SEs in the telecommunications network. The central network control function uses the NEID to address specific nodes, e.g. for configuring the SE or obtaining status information therefrom. By "central" is meant a single entity servicing a network, as opposed to each NE acting independently. The actual location of such an entity is not defined. According to the present invention the conventional SID value allocated to each port of an SE is replaced by the NEID value corresponding to the SE to which that port is directly connected. This automatically copes with the situation where more than one port on any particular SE is directly connected to the same source/destination SE. When combined with the above described system for checking SIDs at output ports in order to detect looping back of synchronisation signals, the present invention advantageously prevents the looping back of synchronisation signals received from a second SE to the same second SE without that synchronisation signal being correctly identified with an SSM of DNU.

Allocation of SID values is currently effected manually based on SE connectivity data relating to the telecommunications network. This manual activity is tedious and prone to error. The replacement of the current SID values with values incorporating the NEID of the connected SE advantageously reduces the scope for error by making the correct SID more easily identifiable to the operator.

In a preferred embodiment of the present invention, the SID value of each port is automatically set-up by the central network control function on the basis of the NEID information and the connectivity information already contained in that function. This may be simply achieved by arranging for the central network control function to send a control message to each SE containing instructions regarding the setting of the various SIDs for each port.

To be precise, these SIDs should now be referred to as destination identifiers (DIDs) as they determine the destination to which the synchronisation signal output at that port is directed.

In a further preferred embodiment of the present invention each network equipment is programmed on initialisation to send a message containing its own NEID to each adjacent network equipment. Each SE is also programmed, on receiving the "NEID" message from its adjacent SEs to set the values of the SIDs of its ports to the NEID value contained in the message received at that port.

In a further preferred embodiment, the SEs repeatedly send NEID messages to adjacent SEs e.g. as a background or a regularly scheduled task, thus advantageously allowing for any changes in the topology of the network to be automatically reflected in the SID allocation of the SEs affected.

FIG. 5 shows application of the invention to a complex network in which multitude of SEs are interconnected. Each SE in FIG. 5 is identified by its NEID which, as is normally in the case, consists of a name that is usually derived from the geographical location of the SE. The central SE comprises 7 ports $P_1$ to $P_7$, each port is connected to a further SE and, in particular ports $P_6$ and $P_7$ are both directly connected to SE "New Port". Each of the SEs connected to SE "Central" has further ports for connection with other SEs (not shown). According to the invention both the ports of SE "New Port" that are directly connected to SE "Central" are given the SID "Central". As a result, if the synchronisation signal selected by SE "New Port" is from one of the ports connected to SE "Central", this synchronisation signal is sent out of both ports connected to SE "Central" with an SSM of DNU.

Although the above embodiments have been described with reference to SDH equipment the same techniques are equally applicable to other synchronous communications systems notably SONET systems.

I claim:

1. A communications system, comprising:
   a) a plurality of interconnected network elements (NE), in which each NE is associated with a unique NE identifier (NEID) value and comprises one or more input ports, and one or more output ports;
   b) each input port being provided for inputting from an adjacent one of the plurality of NEs, a synchronization signal and a quality level indication (QLI) for indicating a quality of a source of the synchronization signal, and being associated with a source identifier (SID) value that identifies the input port at which each synchronization signal is input from the said adjacent NE, the SID value of each input port comprising the NEID value of the adjacent NE;
   c) each output port of each NE being provided for outputting to an adjacent NE, a selected one of the input synchronization signals and the QLI, and comprising a QLI setting means for setting a value of a QLI output at that output port, based on a comparison of the SID value at that output port with the SID value at the input port of the selected one of the input synchronization signals; and
   d) a central management means comprising means for setting the SID value of each port of each NE to the appropriate NEID value.

2. The system as claimed in claim 1, in which each NE comprises sending means for sending its own NEID value to each NE to which it is directly connected.

3. The system as claimed in claim 2, wherein the sending means is arranged to repeatedly send the NEID value.

4. A method of indicating a quality level of synchronization signals in a communications system comprising a plurality of interconnected network elements (NE), each NE comprising one or more input ports and one or more output ports, the method comprising the steps of:
   a) receiving at the input port of each NE, a synchronization signal and a quality level indication (QLI) for indicating a quality of a source of the synchronization signal from an adjacent one of the plurality of NEs;
   b) allocating to each NE a unique NE identifier (NEID) value;
   c) allocating to each input port of an NE a source identifier (SID) value for identifying the input port at which each synchronization signal is input;
   d) sending at an output port of each NE a selected one of the input synchronization signals and the QLI to an adjacent NE;
   e) receiving synchronization signals at the one or more input ports of each NE;
   f) associating each received synchronization signal with the SID value of the input port at which it is input;
   g) selecting for each NE one of the received synchronization signals for output from the one or more output ports of that NE;
   h) comparing the SID value associated with the selected synchronization signal with the SID value associated with each output port at which that synchronization signal is output, and setting a QLI output at each output port according to a result of the comparison;
   i) setting the SID value of each input port to the NEID value of the NE to which that input port is directly connected; and
   j) operating a central management means to associate each input port with the appropriate NEID value.

5. The method as claimed in claim 4, including the step of each NE sending its own NEID value to each NE to which it is directly connected.

6. The method as claimed in claim 5, including the step of each NE repeatedly sending the NEID value.

* * * * *